US012780636B2

(12) United States Patent
Matsumoto

(10) Patent No.: US 12,780,636 B2
(45) Date of Patent: Nov. 3, 2026

(54) CAP ATTACHMENT DEVICE AND CAP PLATE

(71) Applicant: SHIMADZU CORPORATION, Kyoto (JP)

(72) Inventor: Kenta Matsumoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 315 days.

(21) Appl. No.: 18/415,725

(22) Filed: Jan. 18, 2024

(65) Prior Publication Data

US 2024/0246802 A1 Jul. 25, 2024

(30) Foreign Application Priority Data

Jan. 20, 2023 (JP) ................................ 2023-007654

(51) Int. Cl.
*B67B 3/22* (2006.01)
*B67B 3/28* (2006.01)

(52) U.S. Cl.
CPC . *B67B 3/22* (2013.01); *B67B 3/28* (2013.01)

(58) Field of Classification Search
CPC ..... B67B 3/22; B67B 3/28; B67B 3/06–0645; B67B 3/2066; G01N 2035/0418; G01N 2035/0405
See application file for complete search history.

(56) References Cited

U.S. PATENT DOCUMENTS 4,030,271 A * 6/1977 Kefauver .............. B67B 3/2006 53/305
4,696,144 A * 9/1987 Bankuty ................. B67B 3/206 53/317
5,095,681 A * 3/1992 Choi ......................... B67B 3/22 53/367
5,303,835 A * 4/1994 Haber .................. B65D 51/241 215/276
5,519,984 A * 5/1996 Beussink ................ B65B 3/003 53/489

(Continued)

FOREIGN PATENT DOCUMENTS

JP 03-226484 A 10/1991
JP 2014-091553 A 5/2014

OTHER PUBLICATIONS

Office Action in the counterpart Chinese patent application (202410058255.7) and English machine translation thereof.

(Continued)

*Primary Examiner* — Dariush Seif
(74) *Attorney, Agent, or Firm* — Renner, Otto, Boisselle & Sklar, LLP

(57) ABSTRACT

A cap attachment device includes a cap holder, a vial platform, a cap pushing rod and a driver. The cap holder is provided to be liftable and lowerable between a first height and a second height lower than the first height, and holds a cap plate holding a cap. The vial platform is provided below the cap holder. On the vial platform, a vial plate holding a snap vial corresponding to a cap is placed. The cap pushing rod is provided above the cap holder and extends in an up-and-down direction. When the cap holder is at the second height, the driver lifts and lowers the cap pushing rod such that the cap pushing rod pushes a cap held by the cap plate downwardly.

6 Claims, 13 Drawing Sheets

(56) References Cited

U.S. PATENT DOCUMENTS

| | | | | | |
|---|---|---|---|---|---|
| 5,746,042 | A * | 5/1998 | Lombardi | B65B 7/2807 53/308 |
| 6,477,919 | B1 * | 11/2002 | Thomas | B67B 3/02 81/3.2 |
| 7,845,149 | B2 * | 12/2010 | Owen | G01N 35/026 53/485 |
| 9,199,755 | B1 * | 12/2015 | Cohen | B67B 7/02 |
| 9,931,604 | B2 * | 4/2018 | Felden | G01N 1/28 |
| 11,267,683 | B2 * | 3/2022 | Hovendahl | B65B 57/04 |
| 12,064,394 | B1 * | 8/2024 | Ward | A61J 1/2003 |
| 12,492,111 | B2 * | 12/2025 | Hovendahl | B67B 3/20 |
| 12,515,934 | B2 * | 1/2026 | Rey | B65B 7/2807 |
| 2003/0041560 | A1 * | 3/2003 | Kemnitz | B65B 7/2828 53/331.5 |
| 2004/0261262 | A1 * | 12/2004 | Clemons | B65B 7/285 53/329.2 |
| 2005/0257623 | A1 * | 11/2005 | Kitamoto | B65B 7/2821 73/761 |
| 2006/0137760 | A1 * | 6/2006 | Dubois | B65B 1/32 141/1 |
| 2008/0216312 | A1 * | 9/2008 | Williams | B65B 7/2821 29/773 |
| 2011/0271642 | A1 * | 11/2011 | Monti | B67B 1/04 53/319 |
| 2013/0116102 | A1 * | 5/2013 | Hansen | G01N 35/026 494/10 |
| 2014/0311090 | A1 * | 10/2014 | Weber | G01N 35/0099 53/381.4 |
| 2015/0132841 | A1 * | 5/2015 | Sampson | B01L 9/06 422/561 |
| 2015/0175398 | A1 * | 6/2015 | Christensen | B67B 7/182 53/318 |
| 2017/0081056 | A1 * | 3/2017 | Zambaux | A61M 5/30 |
| 2017/0113909 | A1 * | 4/2017 | Frey | B67B 3/2053 |
| 2018/0021784 | A1 * | 1/2018 | Weber-Hovendahl | B01L 9/06 211/74 |
| 2018/0023893 | A1 * | 1/2018 | Schuetz | F26B 5/06 34/287 |
| 2021/0155978 | A1 * | 5/2021 | Tidd | C12Q 1/6844 |
| 2023/0026236 | A1 * | 1/2023 | Boscaro | B67B 1/04 |
| 2023/0030340 | A1 * | 2/2023 | Boscaro | B67B 1/04 |
| 2024/0246802 | A1 * | 7/2024 | Matsumoto | B67B 3/28 |
| 2026/0085275 | A1 * | 3/2026 | Knight | B01L 3/502715 |

OTHER PUBLICATIONS

Office Action for corresponding Japanese Patent Application No. 2023-007654 dated Jun. 30, 2026.

* cited by examiner

CAP ATTACHMENT DEVICE AND CAP PLATE

BACKGROUND

Technical Field

The present disclosure relates to a cap attachment device and a cap plate.

Description of Related Art

Pre-processing may be performed on a sample with use of a container such as a centrifuge tube before the sample is analyzed in an analysis device. As the container, a screw vial which is attachable and detachable by rotation of a screw cap is used. Further, a cap attachment-detachment device that attaches a cap to and detaches a cap from a screw vial has been developed.

For example, in a cap opening-closing device described in JP 03-226484 A, a sample container is gripped by a pair of grippers of a grip opening-closing driver, and a cap is gripped by a robot hand. In this state, the grip opening-closing driver is rotated, so that the cap is attached or detached.

SUMMARY

In recent years, because of easiness of handling, a snap vial into which a cap can be fitted when the cap is pushed from above may be used as a sample container instead of a screw vial. However, it is not easy to suitably attach the cap to the snap vial because the cap is likely to tilt when the cap is pushed. Therefore, it is desirable to develop a cap attachment device that can attach a cap to a snap vial.

An object of the present disclosure is to provide a cap attachment device and a cap plate that can attach a cap to a snap vial.

One aspect of the present disclosure relates to a cap attachment device that includes a cap holder that is provided to be liftable and lowerable between a first height and a second height lower than the first height, and holds a cap plate holding a cap, a vial platform which is provided below the cap holder and on which a vial plate holding a snap vial corresponding to the cap is placed, a cap pushing rod that is provided above the cap holder and extends in an up-and-down direction, and a driver that lifts and lowers the cap pushing rod such that the cap pushing rod pushes the cap held by the cap plate downwardly when the cap holder is at the second height.

Another aspect of the present disclosure relates to a cap plate that is used in the above-mentioned cap attachment device, wherein the cap includes a cap body attached to the snap vial and a cylindrical filter portion extending downwardly from the cap body, and the cap plate includes a body plate in which a second opening into which the cap body is inserted is formed, and a filter holding film in which a third opening that abuts against an outer peripheral surface of the filter portion is formed and which is provided at the body plate.

With the present disclosure, a cap can be vertically pressed against a snap vial, thereby being suitably attached.

Other features, elements, characteristics, and advantages of the present disclosure will become more apparent from the following description of preferred embodiments of the present disclosure with reference to the attached drawings.

DETAILED DESCRIPTION

1. First Embodiment

(1) Configuration of Cap Attachment Device

Figure 1:
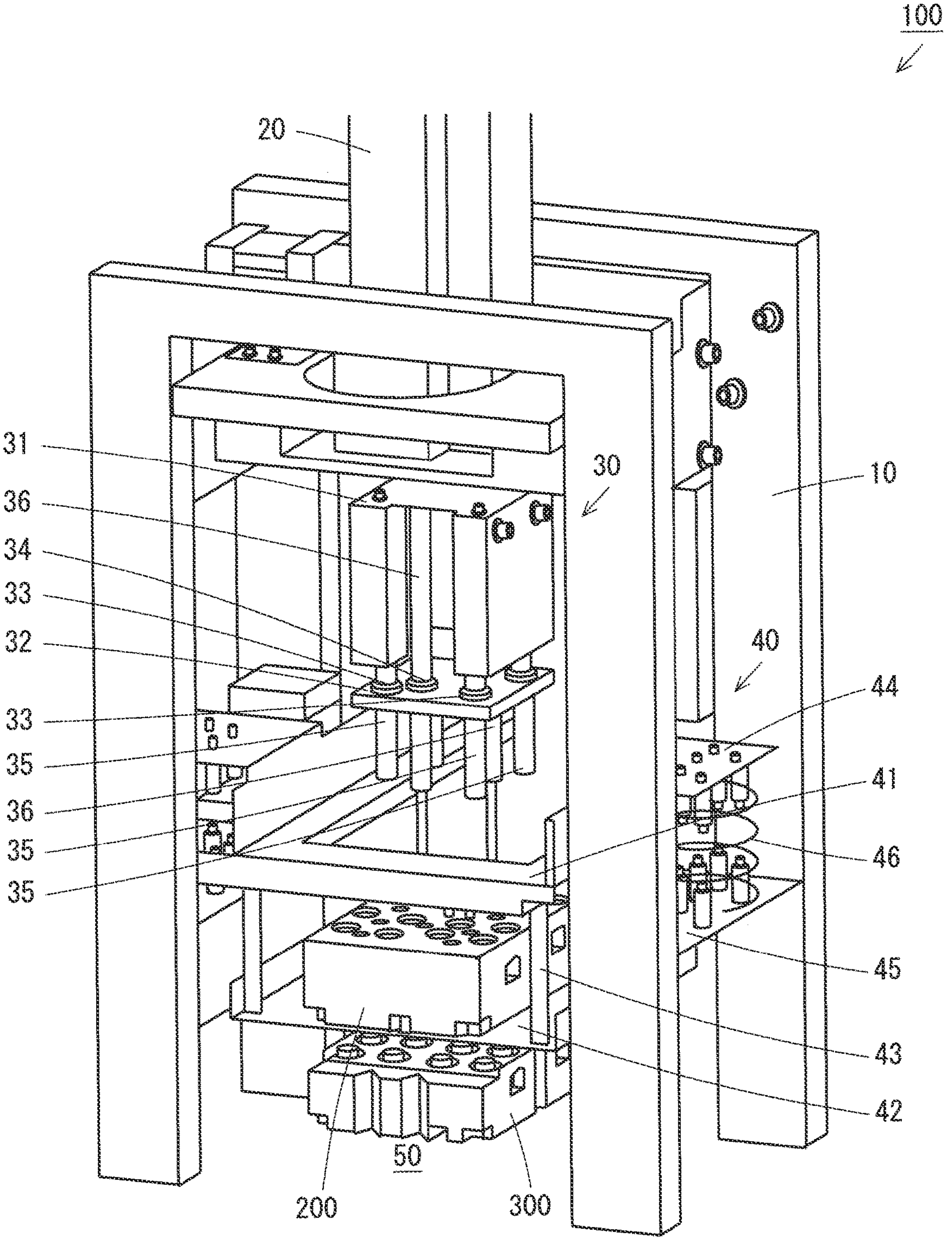
FIG. 1 is a perspective view showing the appearance of a cap attachment device according to a first embodiment of the present disclosure.

A cap attachment device according to embodiments of the present disclosure will be described below in detail with reference to the drawings. FIG. 1 is a perspective view showing the appearance of a cap attachment device according to a first embodiment of the present disclosure. The cap attachment device 100 of FIG. 1 can attach a cap to a snap vial. In the following description, a state before the cap attachment device 100 starts attaching a cap to a snap vial is referred to as a waiting state. Further, a state immediately before the cap attachment device 100 attaches the cap to the snap vial is referred to as an attachment state.

As shown in FIG. 1, the cap attachment device 100 includes a base 10, a driver 20, a lifting-lowering unit 30, a cap support unit 40 and a vial platform 50. The base 10 is provided at an installation surface of the cap attachment device 100. The driver 20 includes an actuator such as an air cylinder having a drive arm that is extendible and contractible. The driver 20 is attached to an upper portion of the base 10 with the drive arm directed downwardly, and extendible and contractible.

The lifting-lowering unit 30 is attached to the base 10 to be liftable and lowerable. The drive arm of the driver 20 extends and contracts, so that the lifting-lowering unit 30 is lifted and lowered. The cap support unit 40 is attached to the base 10 to be liftable and lowerable. A plurality of cap plates 200 are sequentially carried into and carried out from the cap support unit 40 by a transport arm (not shown), for example. Each cap plate 200 holds a plurality of caps to be respectively attached to a plurality of snap vials. Each cap has a circular outer peripheral surface. Details of the lifting-lowering unit 30 and the cap support unit 40 will be described below.

The vial platform 50 is provided below the cap support unit 40. A plurality of vial plates 300 are sequentially carried into and carried out from the vial platform 50 by a belt conveyor (not shown), for example. Each vial plate 300 holds a plurality of snap vials. In the vial platform 50, each vial plate 300 that has been carried in is placed, and the plurality of caps are respectively attached to the plurality of snap vials. Each snap vial has a circular outer peripheral surface. The vial platform 50 may be part of the above-mentioned belt conveyor.

Figure 2:
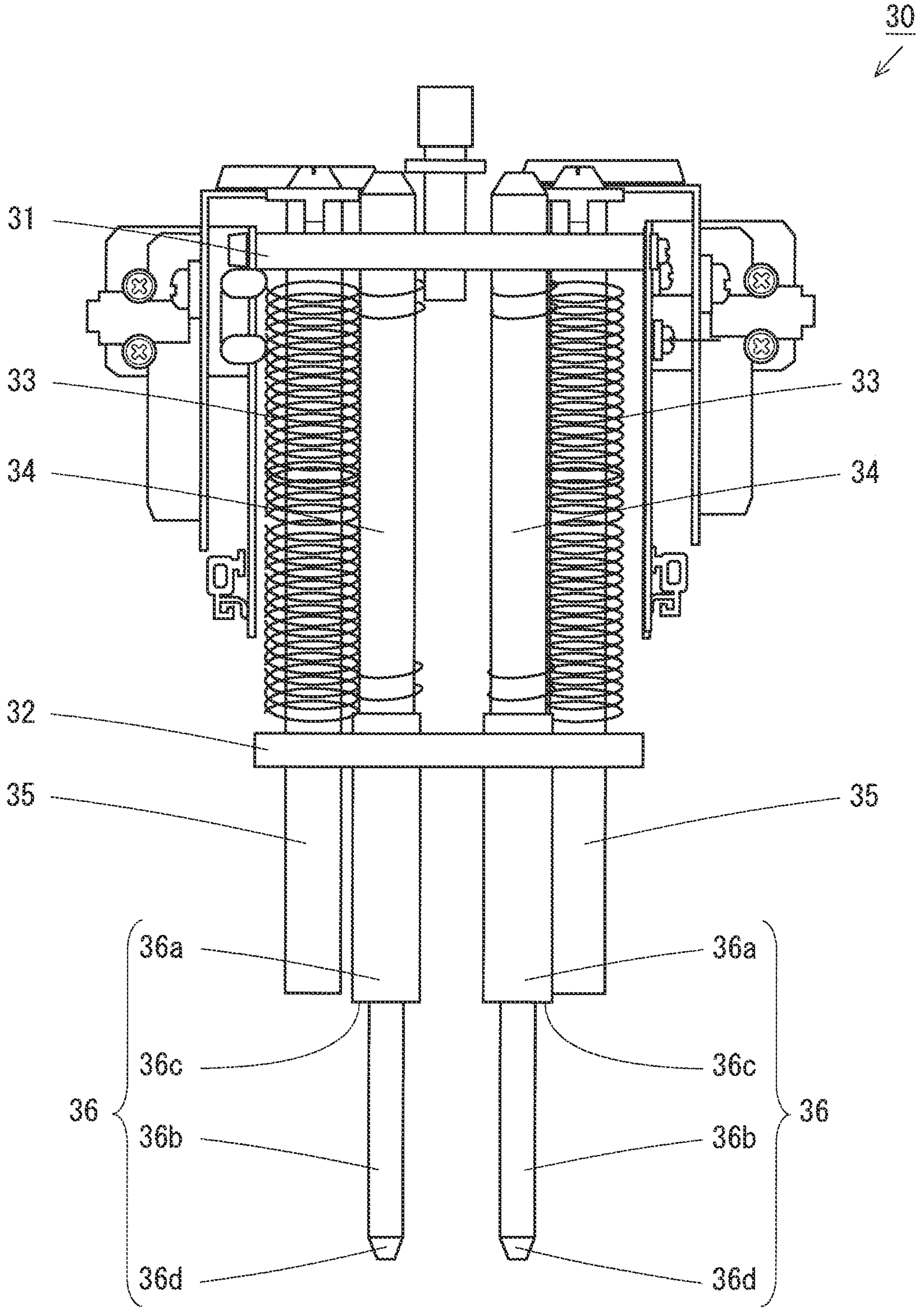
FIG. 2 is a side view showing the configuration of a lifting-lowering unit.

FIG. 2 is a side view showing the configuration of the lifting-lowering unit 30. As shown in FIG. 2, the lifting-lowering unit 30 includes support plates 31, 32, a plurality of spring members 33, a plurality of spring members 34, a plurality of cap pushing rods 35 and a plurality of plate pushing rods 36. The support plate 31 is attached to the base 10 of FIG. 1 to be liftable and lowerable. An upper portion of the support plate 31 is connected to the drive arm of the driver 20 of FIG. 1. The support plate 32 is arranged below the support plate 31 and is coupled to the support plate 31 by a plurality of coupling members. The support plates 31, 32 are collectively referred to as a supporter.

The plurality of spring members 33 are provided so as to respectively correspond to the plurality of cap pushing rods 35. The plurality of spring members 34 are provided so as to respectively correspond to the plurality of plate pushing rods 36. In the present example, the cap attachment device 100 has the four cap pushing rods 35 and the two plate pushing rods 36. Therefore, in the present example, the four spring members 33 and the two spring members 34 are provided. Each of the spring members 33, 34 supports an upper portion of the corresponding cap pushing rod 35 or an upper portion of the corresponding plate pushing rod 36 at the support plates 31, 32 while extending.

Each cap pushing rod 35 has a columnar shape and extends in an up-and-down direction, for example. In the present example, the four cap pushing rods 35 are arranged in two rows and two columns. As described above, an upper portion of each cap pushing rod 35 is supported by the support plates 31, 32 via the spring member 33. A lower portion of each cap pushing rod 35 farther projects downwardly than the support plate 32.

In the present example, the two plate pushing rods 36 are arranged between the two diagonally located cap pushing rods 35 among the four cap pushing rods 35. Each plate pushing rod 36 includes a base portion **36*a* and a tip portion 36*b*. Each base portion 36*a* has a columnar shape and extends in the up-and-down direction. An upper portion of each base portion 36*a* is supported by the support plates 31, 32 via the spring member 34. A lower portion of the base portion 36*a* projects farther downwardly than the support plate 32**.

The tip portion **36*b* has a columnar shape having a diameter smaller than that of the base portion 36*a*, and extends downwardly from the center portion of the lower end surface of the base portion 36*a*. Thus, each plate pushing rod 36 has a step portion 36*c* between the base portion 36*a* and the tip portion 36*b* below the support plate 32. The base portion 36*a* is longer than the cap pushing rod 35 in the up-and-down direction. Therefore, in the waiting state of the cap attachment device 100, the lower end surface of the base portion 36*a*, that is, the step portion 36*c* is located farther downwardly than lower end surface of the cap pushing rod 35. Further, the lower end portion of each tip portion 36*b* has a tapered surface 36*d*** the diameter of which continuously decreases downwardly.

Figure 3:
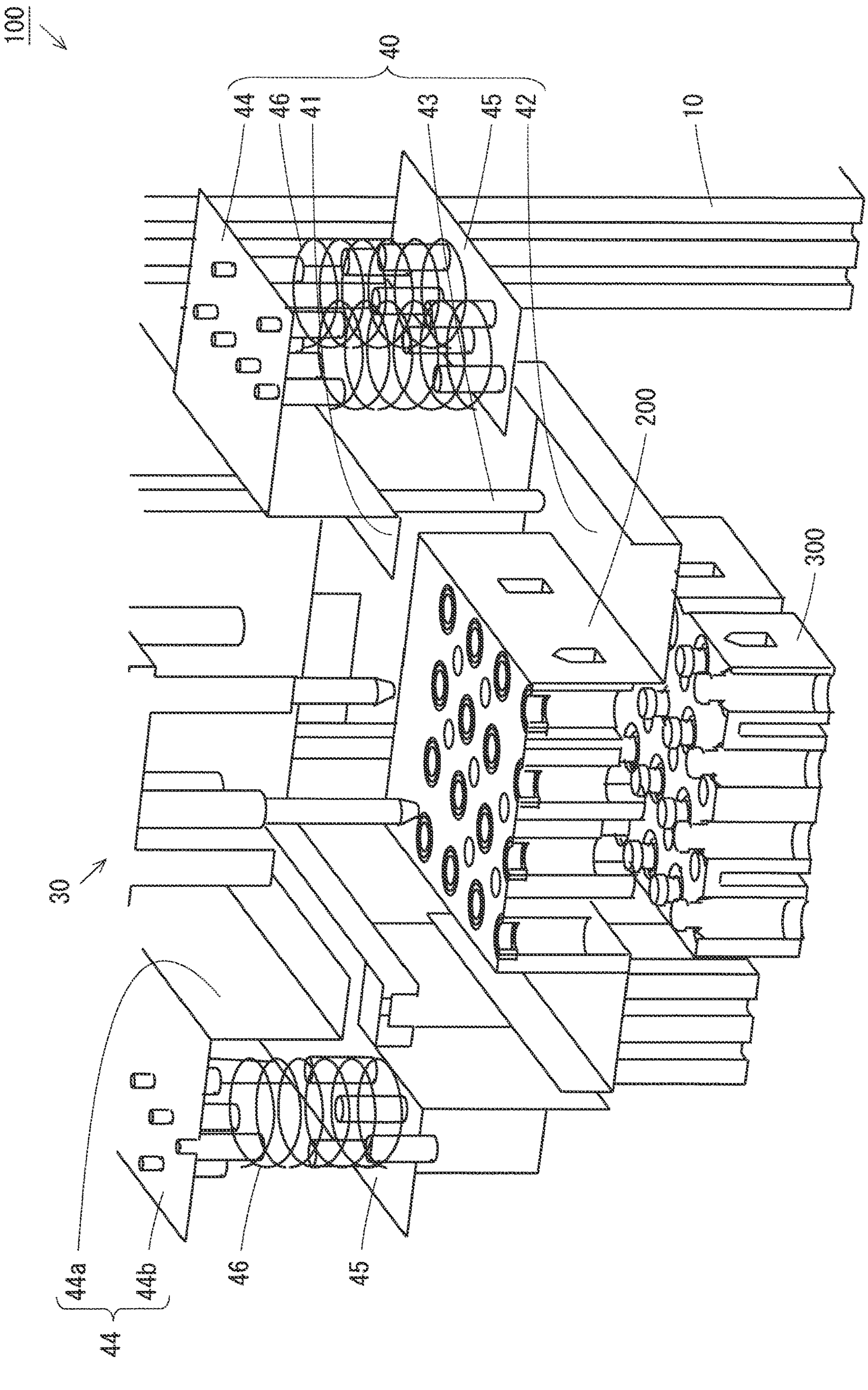
FIG. 3 is a perspective view of the cap attachment device for explaining the configuration of a cap support unit.

FIG. 3 is a perspective view of the cap attachment device 100 for explaining the configuration of the cap support unit 40. As shown in FIG. 3, the cap support unit 40 includes a lifting-lowering frame 41, a cap holder 42, a plurality of coupling rods 43, a plurality of lifting-lowering plates 44, a plurality of fixing plates 45 and a plurality of spring members 46. The lifting-lowering frame 41 is attached to the base 10 so as to be liftable and lowerable. In a center portion of the lifting-lowering frame 41, an opening through which a lower portion of the lifting-lowering unit 30 can pass is formed.

The cap holder 42 holds a cap plate 200. In the present example, the cap holder 42 is a stage, and the cap plate 200 is placed on the upper surface of the cap holder 42. In the center portion of the cap holder 42, an opening through which part of the lower surface of the placed cap plate 200 is exposed is formed. The cap holder 42 is arranged below the lifting-lowering frame 41 and is coupled to the lifting-lowering frame 41 by the plurality (four, for example) of coupling rods 43. Therefore, the cap holder 42 is liftable and lowerable integrally with the lifting-lowering frame 41.

Each of the plurality (two in the present example) of lifting-lowering plates 44 includes a vertical surface portion **44*a* and a horizontal surface portion 44*b* and has an inverted L-shaped cross section. In the present example, the vertical surface portions 44*a* of the two lifting-lowering plates 44 are respectively attached to both of the side portions of the lifting-lowering frame 41. Thus, the plurality of lifting-lowering plates 44 are liftable and lowerable integrally with the lifting-lowering frames 41. The horizontal surface portion 44*b* of each of the lifting-lowering plates 44 projects sidewardly from the lifting-lowering frame 41**.

Each fixing plate 45 has a flat plate shape. A plurality of fixing plates 45 respectively correspond to the plurality of lifting-lowering plates 44. Each fixing plate 45 is arranged below the horizontal surface portion **44*b* of the corresponding lifting-lowering plate 44 and is fixed to the base 10. A spring member 46 is provided between the horizontal surface portion 44*b* of each of the lifting-lowering plates 44 and the corresponding fixing plate 45. The plurality of spring members 46** may be provided in parallel to one another.

Each spring member 46 biases the corresponding lifting-lowering plate 44 upwardly while extending. Thus, the lifting-lowering frame 41 and the cap holder 42 always receive an upward force from the plurality of spring members 46 via the plurality of lifting-lowering plates 44. In the waiting state of the cap attachment device 100, the upper surface of the horizontal surface portion **44*b* of each lifting-lowering plate 44 abuts against a mechanical stopper provided at the base 10. In the present example, a resultant force of loads applied by the plurality of spring members 46 is smaller than a resultant force of loads applied by the plurality of spring members 34 (FIG. 2) of the lifting-lowering unit 30**.

(2) Cap Plate and Vial Plate

Figure 4:
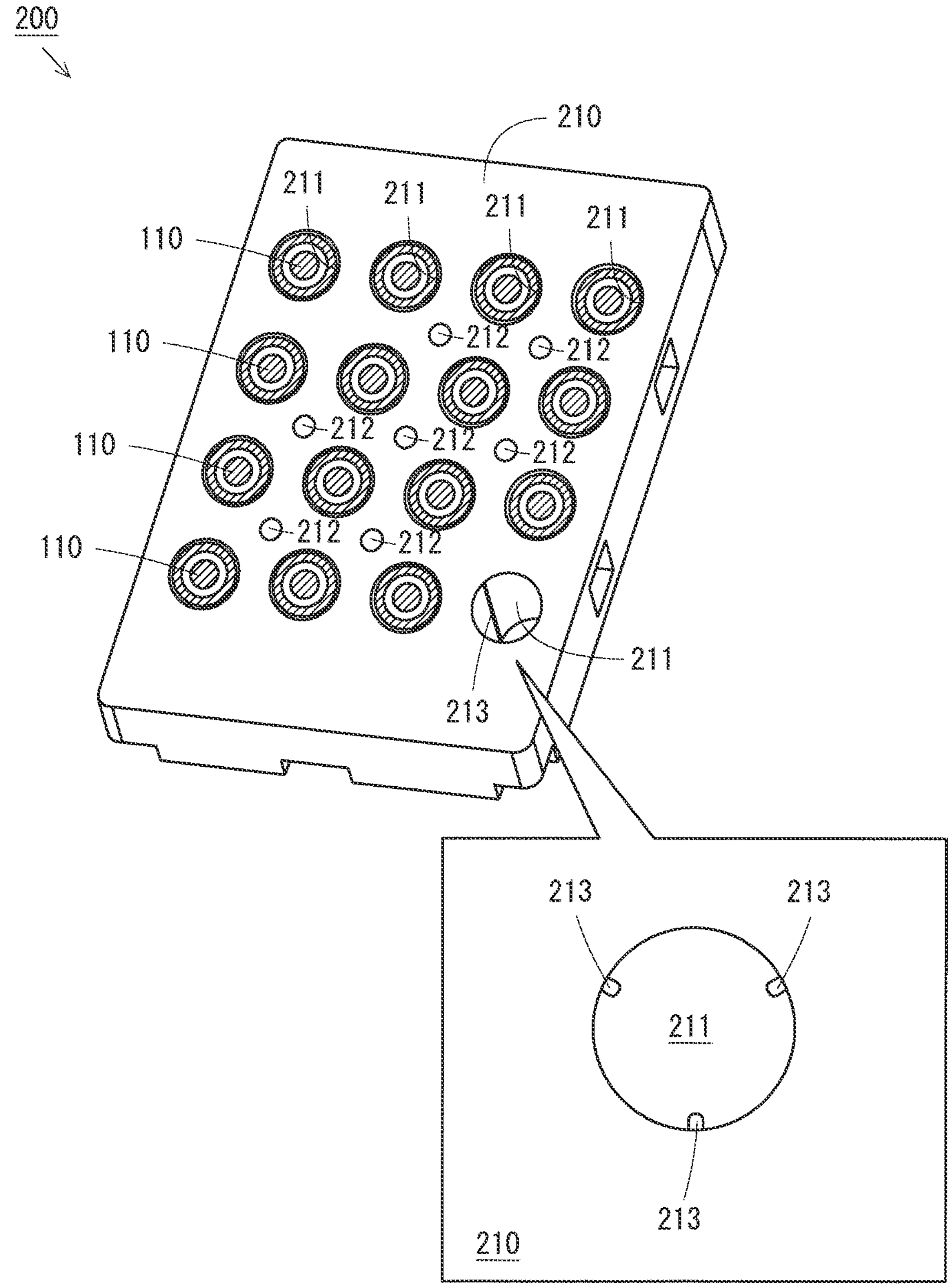
FIG. 4 is a perspective view showing the configuration of a cap plate.
Figure 5:
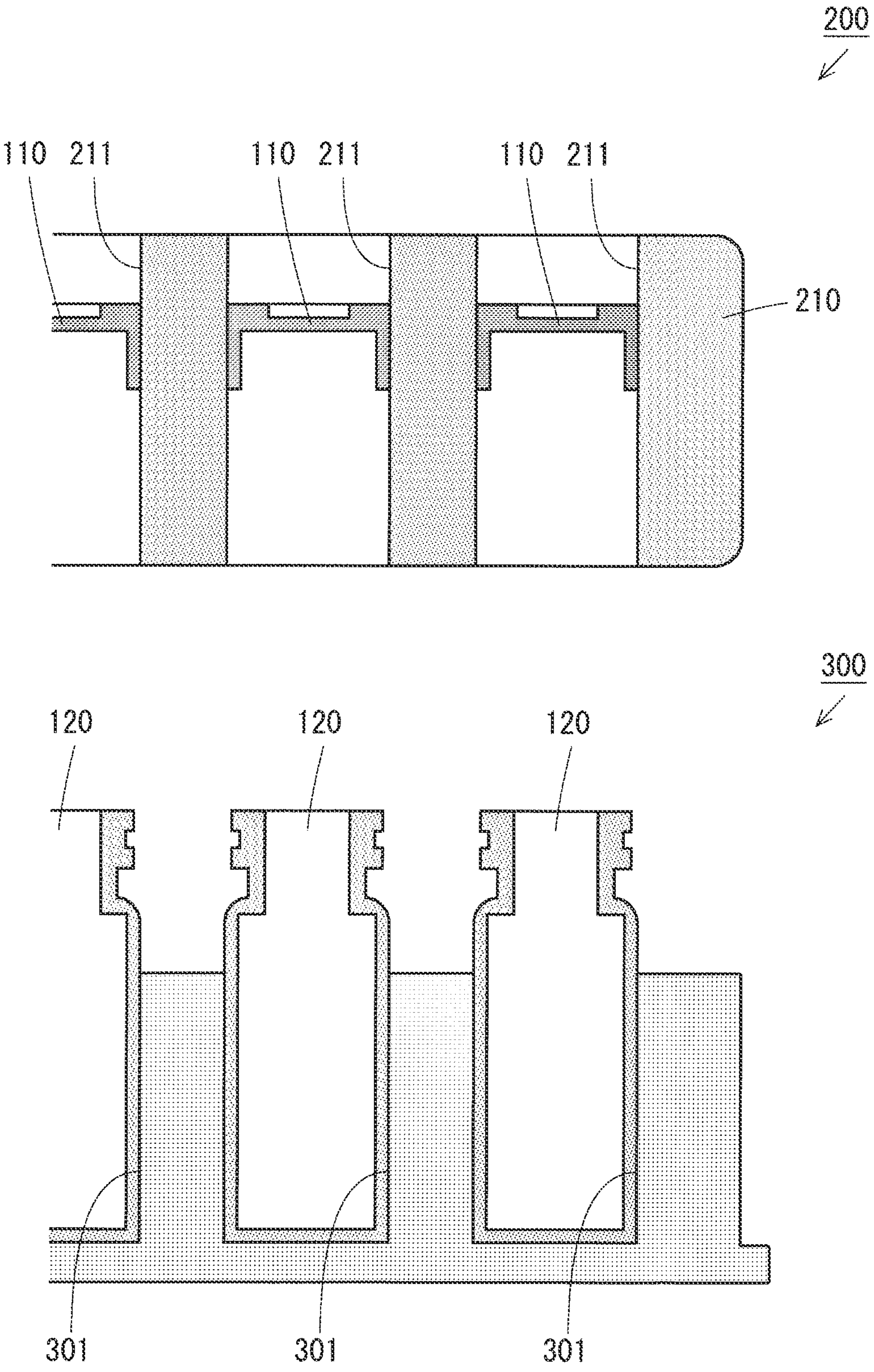
FIG. 5 is a cross sectional view showing the configurations of the cap plate and a vial plate.

FIG. 4 is a perspective view showing the configuration of the cap plate 200. FIG. 5 is a cross sectional view showing the configurations of the cap plate 200 and the vial plate 300. As shown in FIGS. 4 and 5, the cap plate 200 includes a substantially rectangular body plate 210 having a predetermined thickness. In the present example, the thickness of the body plate 210 is larger than the length of the tip portion 36*b* of the plate pushing rod 36 of FIG. 2 and is larger than the height of the cap 110.

In the body plate 210, a plurality of circular openings 211 that penetrate in a thickness direction are formed. An opening 211 is an example of a second opening. The diameter of each opening 211 is slightly larger than the diameter of the cap 110. The plurality of openings 211 are regularly aligned in the direction of one pair of sides and the direction of the other pair of sides of the body plate 210 in plan view. Four openings 211 aligned in two rows and two columns among the plurality of openings 211 respectively correspond to the four cap pushing rods 35 of FIG. 2.

Further, in the upper surface of the body plate 210, a plurality of circular openings 212 are formed. An opening 212 is an example of a first opening. In the present example, two openings 212 are formed between two diagonally located openings 211 among the above-mentioned four openings 211. Two openings 212 respectively correspond to two plate pushing rods 36 of FIG. 2. The diameter of the opening 212 is larger than the diameter of the tip portion 36*b* of the plate pushing rod 36 and is smaller than the diameter of the base portion 36*a*. In a case in which the depth of the opening 212 is larger than the length of the tip portion 36*b*, the opening 212 may be a through hole or a bottomed hole.

A plurality of caps 110 are respectively fitted into the plurality of openings 211. Thus, the plurality of caps 110 are held by the body plate 210. In the present example, as shown in the balloon of FIG. 4, a plurality (three in the present example) of ribs 213 extending in the up-and-down direction are provided at substantially equal intervals on the inner peripheral surface of each opening 211. The outer peripheral surface of each cap 110 abuts against the plurality of ribs 213 of the corresponding opening 211, whereby each cap 110 is stably held with its posture maintained.

Further, the cap plate 200 holds the plurality of caps 110 with use of a frictional force between the plurality of ribs 213 and the outer peripheral surface of the cap 110. The magnitude of the friction force is the magnitude that enables the friction force to reliably hold the plurality of caps 110 even in a case in which vibration is applied to the plurality of caps 110.

As shown in FIG. 5, the vial plate 300 is a plate having a predetermined thickness. In the upper surface of the vial plate 300, a plurality of openings 301 respectively corresponding to the plurality of openings 211 of the cap plate 200 are formed. Each opening 301 is a bottomed hole. The diameter of each opening 301 is slightly larger than the largest diameter of the snap vial 120.

A plurality of snap vials 120 are respectively fitted into the plurality of openings 301. Thus, the plurality of snap vials 120 are held by the vial plate 300. In the present example, the depth of each opening 301 is smaller than the height of the snap vial 120. Therefore, an upper portion of each snap vial 120 held by the vial plate 300 projects upwardly from the upper surface of the vial plate 300.

Figure 6:
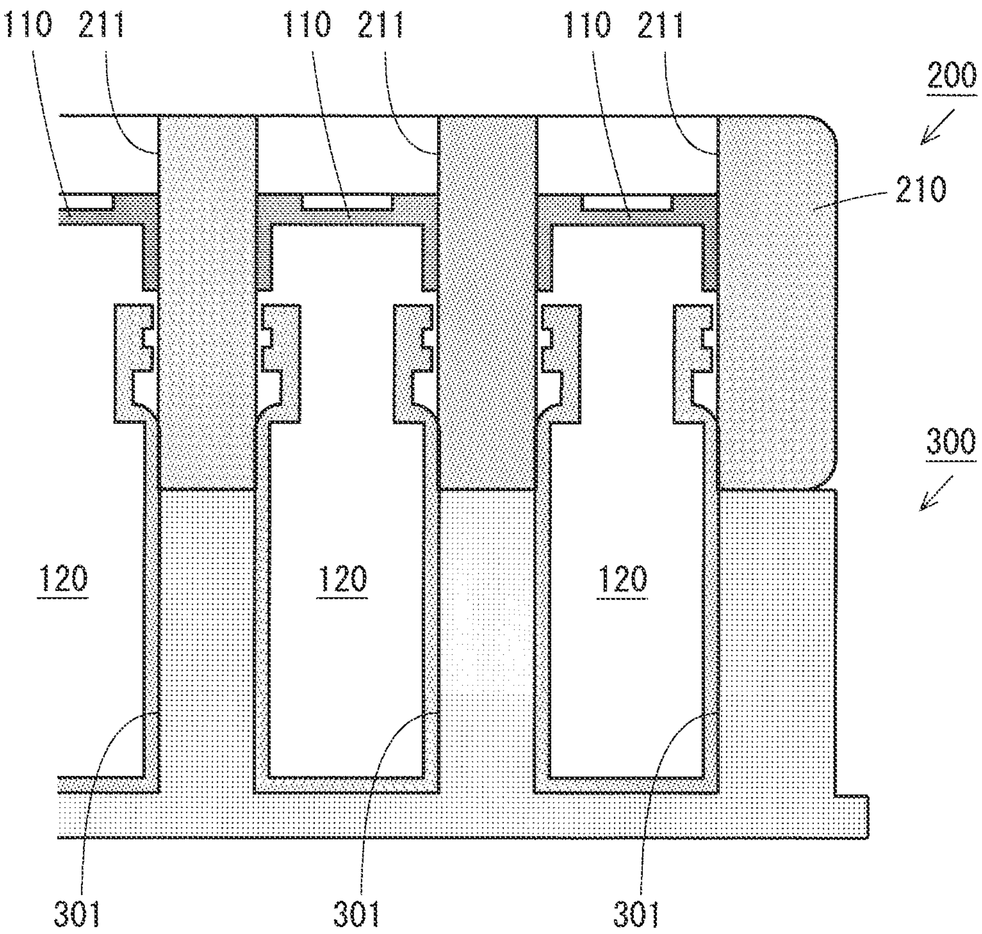
FIG. 6 is a cross sectional view showing the cap plate and the vial plate in an attachment state.

FIG. 6 is a cross sectional view showing the cap plate 200 and the vial plate 300 in the attachment state. As shown in FIG. 6, in the attachment state, the lower surface of the cap plate 200 (the lower surface of the body plate 210) and the upper surface of the vial plate 300 come into contact with each other. At this time, the plurality of caps 110 held by the cap plate 200 are respectively located above the plurality of snap vials 120 held by the vial plate 300. In this state, each cap 110 is pushed from above, so that the cap 110 corresponding to each snap vial 120 can be attached.

In the present example, the largest diameter of the snap vial 120 is substantially equal to the diameter of the cap 110. That is, the diameter of each opening 211 of the body plate 210 is substantially equal to the diameter of the opening 301 of the vial plate 300. Further, the thickness of the body plate 210 is sufficiently larger than the height of the cap 110.

With this configuration, when the cap attachment device 100 is in the attachment state, an upper portion of each snap vial 120 enters the corresponding opening 211 and is surrounded by the inner peripheral surface of the opening 211. Therefore, even in a case in which each snap vial 120 projects from the vial plate 300, it is possible to bring the lower surface of the cap plate 200 into contact with the upper surface of the vial plate 300 without having the cap plate 200 interfere with the snap vial 120.

(3) Operation of Cap Attachment Device

Before an operation of the cap attachment device 100 is started, a user of the cap attachment device 100 fits the plurality of respective caps 110 to the plurality of respective openings 211 of the cap plate 200 such that the caps 110 are held, and then places the cap plate 200 at a predetermined position. Further, the user of the cap attachment device 100 fits the plurality of respective snap vials 120 to the plurality of respective openings 301 of the vial plate 300 such that the snap vials 120 are held, and then places the vial plate 300 at a predetermined position.

Figure 7:
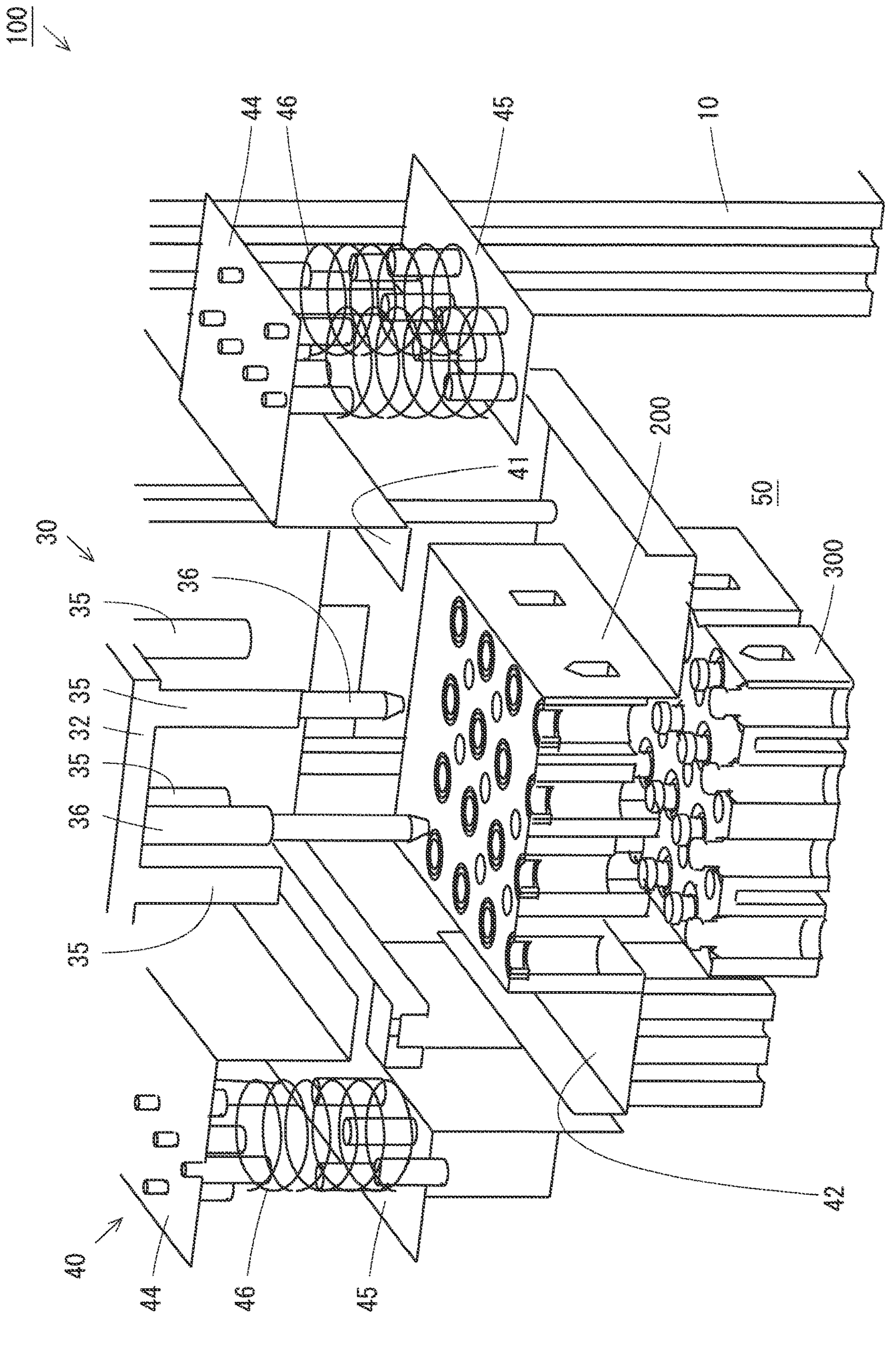
FIG. 7 is a diagram for explaining the operation of the cap attachment device.

FIGS. 7 to 10 are diagrams for explaining the operation of the cap attachment device 100. As shown in FIG. 7, before attachment of the caps 110 to the snap vials 120 is started, the cap attachment device 100 is in the waiting state. The height of the cap holder 42 at this time is an example of a first height. The transport arm (not shown) transports the cap plate 200 from the predetermined position to the cap holder 42. Thus, the cap plate 200 is placed on the cap holder 42. In the waiting state of the cap attachment device 100, the cap plate 200 placed on the cap holder 42 is located below the lifting-lowering unit 30.

Further, the belt conveyor (not shown) transports the vial plate 300 from the predetermined position to the vial platform 50. Thus, the vial plate 300 is placed on the vial platform 50. The vial plate 300 placed on the vial platform 50 is located below the cap plate 200 placed on the cap holder 42.

Next, the drive arm of the driver 20 of FIG. 1 extends downwardly, so that the lifting-lowering unit 30 is lowered. Thus, the diameter of the tip portion 36*b* of the plate pushing rod 36 of FIG. 2 is smaller than the opening 212 of the cap plate 200 of FIG. 4. Therefore, in a case in which the opening 212 is present below each plate pushing rod 36, each tip portion 36*b* enters the corresponding opening 212 by lowering of the lifting-lowering unit 30.

Further, there may be a slight positional deviation between the cap plate 200 and the lifting-lowering unit 30. Even in this case, when the lifting-lowering unit 30 is lowered, the position of the cap plate 200 is slightly moved such that each tip portion 36*b* enters the corresponding opening 212. In this manner, the plate pushing rod 36 can be used for the positioning between the cap plate 200 and the lifting-lowering unit 30.

In the present example, as shown in FIG. 2, the lower end portion of each tip portion 36*b* has the tapered surface 36*d*. In this case, the cap plate 200 is moved such that the inner peripheral surface of the opening 212 is moved along the tapered surface 36*d* of the tip portion 36*b*. Thus, the positioning between the cap plate 200 and the lifting-lowering unit 30 can be smoothly carried out.

Figure 8:
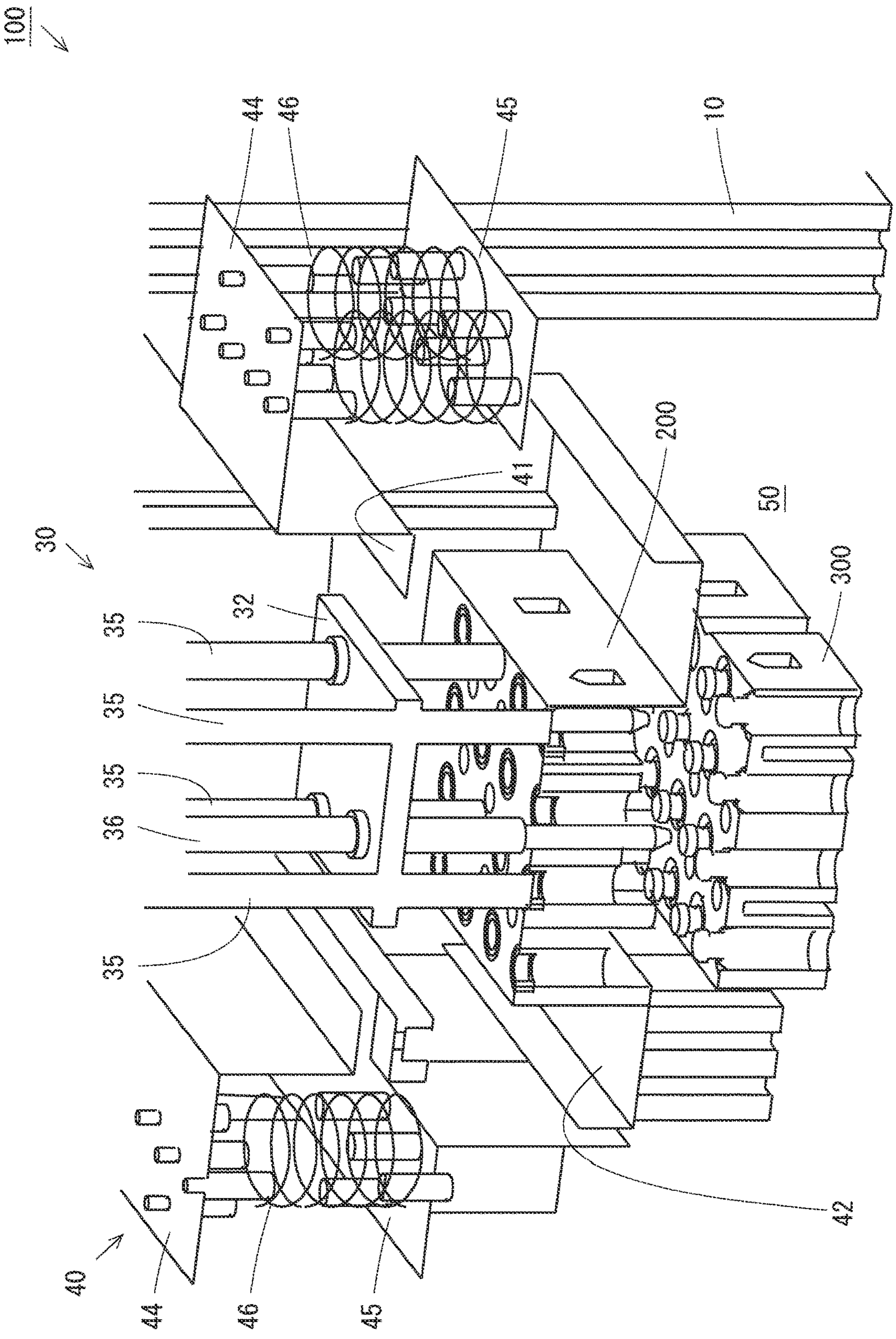
FIG. 8 is a diagram for explaining the operation of the cap attachment device.

The diameter of the base portion 36*a* of the plate pushing rod 36 of FIG. 2 is larger than the diameter of the opening 212. Further, the depth of the opening 212 is larger than the length of the tip portion 36*b*. Further, the step portion 36*c* of the plate pushing rod 36 is located farther downwardly than the lower end surface of the cap pushing rod 35. In this case, the lifting-lowering unit 30 further continues to be lowered, so that the step portion 36*c* of the plate pushing rod 36 comes into contact with the upper surface of the cap plate 200 as shown in FIG. 8.

The lifting-lowering unit 30 further continues to be lowered, so that the step portion 36*c* of the plate pushing rod 36 further pushes the cap holder 42 downwardly via the cap plate 200. Here, a resultant force of loads applied by the plurality of spring members 46 provided at the cap support unit 40 is smaller than a resultant force of loads applied by the plurality of spring members 34 of FIG. 2 provided at the plurality of plate pushing rods 36. Therefore, when the cap holder 42 is pushed downwardly, each spring member 46 is contracted. Thus, the lifting-lowering frame 41, the cap holder 42 and the plurality of lifting-lowering plates 44 are integrally lowered.

Figure 9:
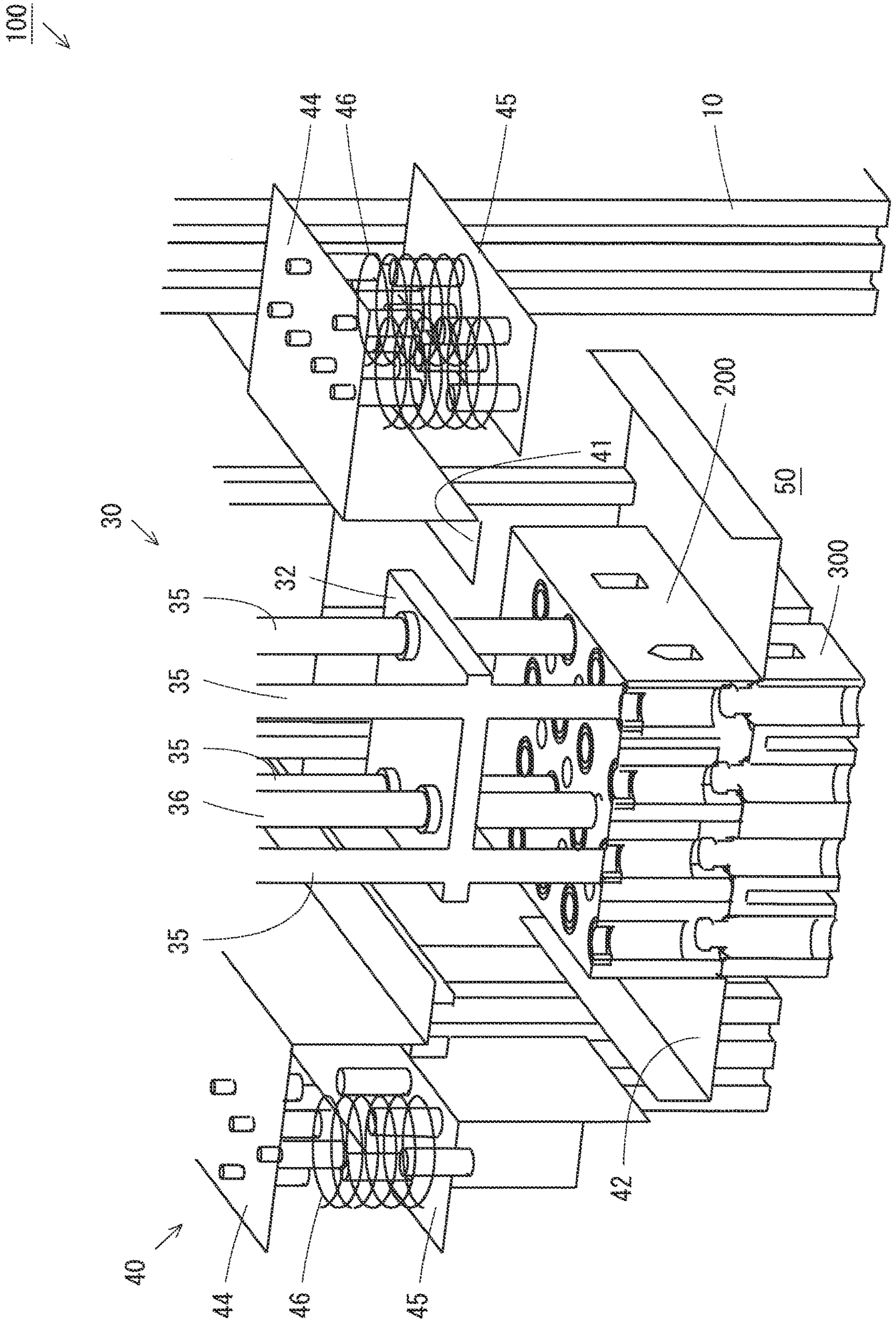
FIG. 9 is a diagram for explaining the operation of the cap attachment device.

The lifting-lowering unit 30 further continues to be lowered, so that the cap holder 42 is further lowered. In this case, as shown in FIG. 9, a portion of the lower surface of the cap plate 200 exposed from the cap holder 42 comes into contact with the upper surface of the vial plate 300 placed on the vial platform 50. Thus, the cap attachment device 100 is in the attachment state. The height of the cap holder 42 at this time is an example of a second height.

In the attachment state of the cap attachment device 100, the cap plate 200 is placed on the vial plate 300, so that lowering of the cap plate 200, the lifting-lowering frame 41 and the cap holder 42 and the plurality of lifting-lowering plates 44 is stopped. Therefore, when the lifting-lowering unit 30 continues to be lowered, each spring member 34 of FIG. 2 contracts. Thus, each plate pushing rod 36 is not lowered from a position at which the step portion 36*c* is being in contact with the cap plate 200.

Figure 10:
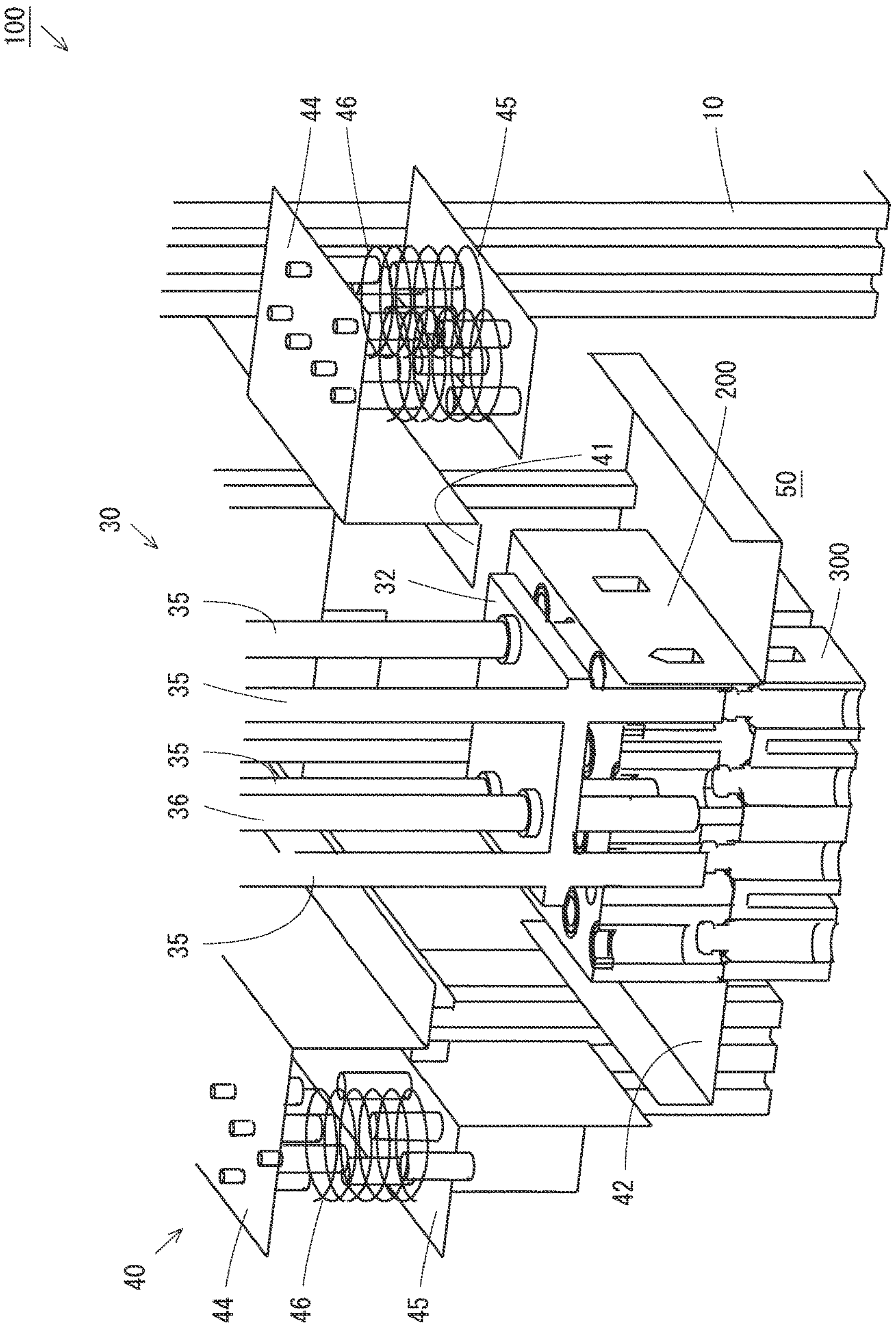
FIG. 10 is a diagram for explaining the operation of the cap attachment device.

On the other hand, when the lifting-lowering unit 30 continues to be lowered, each cap pushing rod 35 of FIG. 2 continues to be lowered, and the lower end portion of each cap pushing rod 35 enters the corresponding opening 211 of the cap plate 200. In this case, as shown in FIG. 10, the cap 110 in each opening 211 is pushed from above by the corresponding cap pushing rod 35. Thus, each cap 110 passes downwardly through the cap plate 200 and is attached to the corresponding snap vial 120 held by the vial plate 300.

In the present example, four caps 110 are attached to four snap vials 120 at the same time. After the caps 110 are attached to the snap vials 120, the drive arm of the driver 20 contracts, so that the lifting-lowering unit 30 is lifted. Further, the lifting-lowering frame 41, the cap holder 42 and the plurality of lifting-lowering plates 44 are lifted by being biased by the plurality of spring members 46. Thus, the cap attachment device 100 returns to the waiting state.

The above-mentioned operation of the cap attachment device 100 is repeated with respect to the plurality of other caps 110 held by the cap plate 200 and the plurality of other snap vials 120 held by the vial plate 300. Thus, all of the caps 110 held by the cap plate 200 can be attached to the corresponding snap vials 120. Thereafter, the cap plate 200 is carried out from the cap holder 42 by the transport arm, and the vial plate 300 is carried out from the vial platform 50 by the belt conveyor.

(4) Effects

In the cap attachment device 100 according to the present embodiment, during the waiting state, that is, in a period during which the cap holder 42 is at the first height, the cap holder 42 and the vial platform 50 are relatively largely spaced apart from each other. In this case, the cap plate 200 and the vial plate 300 can be easily carried into and carried out from the cap attachment device 100 without interference of the cap plate 200 and the vial plate 300 with the cap holder 42 or the vial platform 50.

Further, in the attachment state, that is, in a period during which the cap holder 42 is at the second height, the cap holder 42 and the vial platform 50 are closer to each other than the time when the cap holder 42 is at the first height. In this state, the cap pushing rods 35 are lowered by the driver 20, so that the caps 110 held by the cap plate 200 are pushed downwardly. Thus, the caps 110 are lowered from the cap plate 200 and attached to the snap vials 120 of the vial plate 300.

With this configuration, with the cap plate 200 and the vial plate 300 being sufficiently close to each other, the caps 110 can be attached to the snap vials 120. Therefore, when the caps 110 are attached to the snap vials 120, the postures of the caps 110 are prevented from being largely changed. As a result, all of the caps 110 can be suitably attached to the snap vials 120.

In the present example, at the second height, the cap holder 42 brings the lower surface of the held cap plate 200 into contact with the upper surface of the vial plate 300. In this case, the caps 110 are held by the cap plate 200 until immediately before being attached to the snap vials 120. Thus, the postures of the caps 110 are maintained. Thus, the caps 110 can be more suitably attached to the snap vials 120.

The cap pushing rods 35 are lifted and lowered, and the cap holder 42 is lowered, by the single driver 20. Further, the cap holder 42 is biased upwardly by the spring members 46. With this configuration, the cap holder 42 can be easily maintained at the first height. Further, it is not necessary to separately provide an actuator for lowering the cap holder 42 from the first height to the second height, and it is not either necessary to separately provide an actuator for lifting the cap holder 42 from the second height to the first height. Further, the cost for the cap attachment device 100 can be reduced.

In the present example, the support plates 31, 32 are lifted and lowered by the driver 20, so that the plate pushing rods 36 are lifted and lowered together with the cap pushing rods 35. When the plate pushing rods 36 are lowered, the cap plate 200 is pushed from above by the plate pushing rods 36. Thus, the cap holder 42 is lowered from the first height to the second height.

When the cap holder 42 is lowered to the second height, the lower surface of the cap plate 200 comes into contact with the upper surface of the vial plate 300, and the lowering of the cap plate 200 is stopped. In this case, the spring members 34 contract, so that lowering of the plate pushing rods 36 is stopped. In the meantime, the cap pushing rods 35 continue to be lowered. Thus, with a simple configuration, the cap pushing rods 35 are lifted and lowered, and the cap holder 42 is lowered, by the single driver 20.

The cap plate 200 is pushed as described above by the step portions 36*c* of the plate pushing rods 36 with the tip portions 36*b* of the plate pushing rods 36 inserted into the openings 212 in the upper surface of the cap plate 200. In this case, the plate pushing rods 36 are used for the positioning between the cap plate 200 and the cap pushing rods 35. Thus, the cap 110 can be even more suitably attached to the snap vial 120. Because the tip portions **36*b* of the plate pushing rods 36 have the tapered surfaces 36*d* in the lower end portions, the positioning between the cap plate 200 and the cap pushing rods 35** can be smoothly carried out.

2. Second Embodiment

(1) Configuration of Cap Plate

Figure 11:
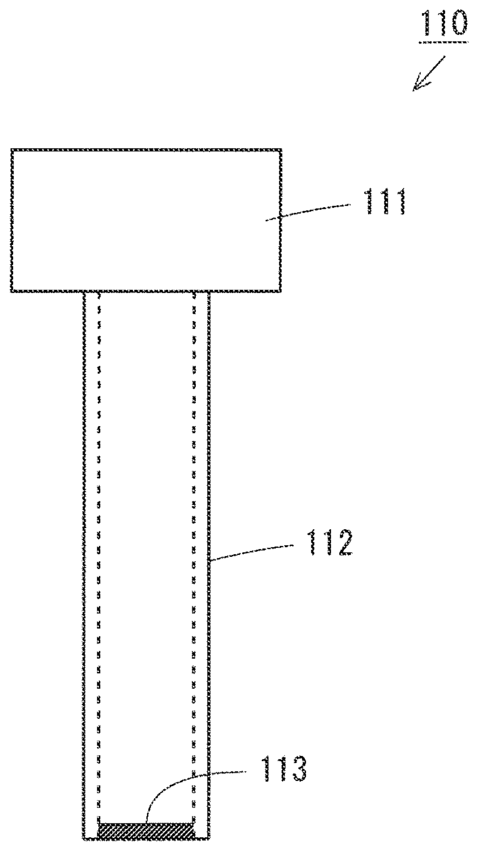
FIG. 11 is a side view showing a cap having a filter function.

The cap 110 may have a filter function of filtering a liquid component contained in the snap vial 120. FIG. 11 is a side view showing the cap 110 having the filter function. As shown in FIG. 11, the cap 110 includes a cap body 111 and a filter portion 112. The filter portion 112 is a cylindrical member formed of resin, for example, and is provided at the cap body 111 so as to project downwardly. A filtration membrane 113 is attached to the lower end portion of the filter portion 112.

With the filter portion 112 inserted into the snap vial 120 of FIG. 5, the cap body 111 is pushed from above, so that the cap body 111 is attached to the snap vial 120. At this time, the liquid component contained in the snap vial 120 is filtered by passing through the filtration membrane 113. The filtered liquid component is stored in the filter portion 112.

Figure 12:
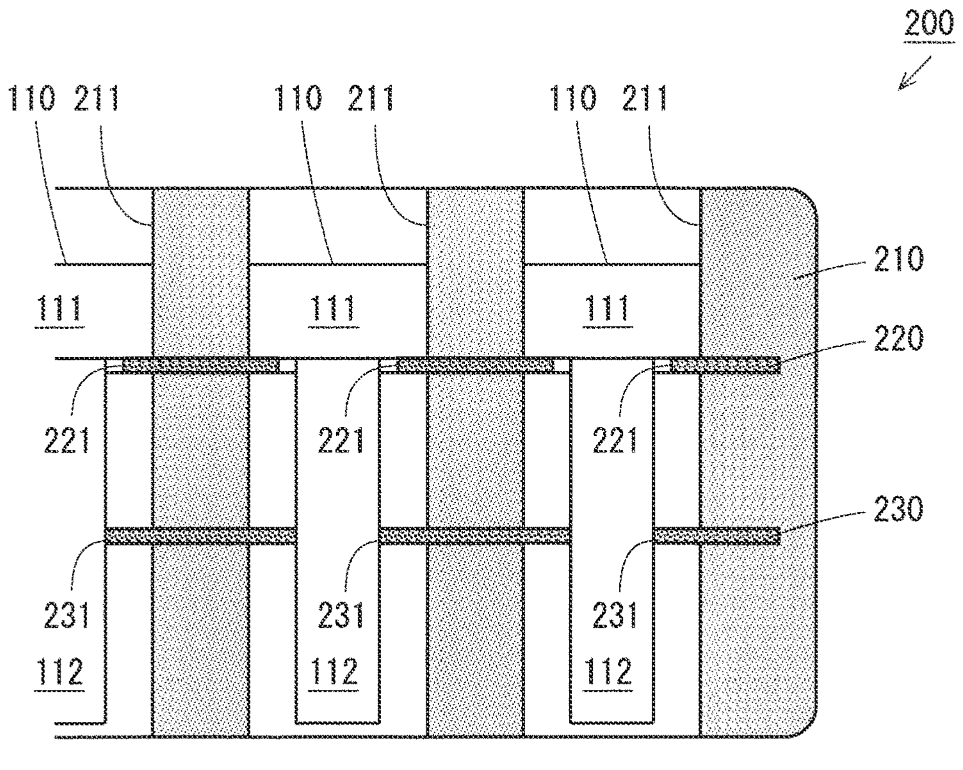
FIG. 12 is a cross sectional view showing a cap plate according to a second embodiment of the present disclosure.

FIG. 12 is a cross sectional view showing a cap plate 200 according to a second embodiment of the present disclosure. The cap plate 200 of FIG. 12 is configured to be capable of suitably holding the cap 110 of FIG. 11. Differences of the cap plate 200 according to the present embodiment from the cap plate 200 according to the first embodiment of FIG. 5 will be described below.

As shown in FIG. 12, the cap plate 200 further includes a cap holding film 220 and a filter holding film 230. The cap holding film 220 is formed of a thin and easily deformable material. The cap holding film 220 may be formed of resin such as polyethylene terephthalate.

The cap holding film 220 is arranged in a lower portion of the plurality of caps 110 held by the body plate 210. In the areas of the cap holding film 220 overlapping with the respective caps 110, a plurality of circular openings 221 are respectively formed. The diameter of each opening 221 is smaller than the diameter of the cap 110 (the diameter of the cap body 111). The opening 221 is an example of a fourth opening. With this configuration, the lower end portion of the corresponding cap 110 abuts against the area surrounding each opening 221 in the upper surface of the cap holding film 220. Thus, each cap 110 is stably held.

Further, when each cap 110 is pushed downwardly from above, the cap holding film 220 is pressed from above by each cap 110. In this case, the cap holding film 220 is elastically deformed, so that each opening 221 is widened. Thus, each cap 110 slides downwardly and passes through the corresponding opening 221. As a result, each cap 110 can pass downwardly through the body plate 210.

The filter holding film 230 is formed of a material similar to that of the cap holding film 220 and is arranged below the cap holding film 220. In the filter holding film 230, a plurality of openings 231 respectively corresponding to the plurality of openings 221 of the cap holding film 220 are formed. The opening 231 is an example of a third opening. The smallest diameter of each opening 231 is substantially equal to the diameter of the filter portion 112 of the cap 110.

In a case in which the configuration such as the filter portion 112 is provided in a lower portion of the cap 110, when the cap 110 is held at the cap plate 200 while tilting, the filter portion 112 may deviate from the opening position of the snap vial 120. However, with this configuration, the outer peripheral surface of the filter portion 112 of the cap 110 fitted into each opening 211 of the body plate 210 abuts against the inner peripheral surface of the corresponding opening 231. In this case, with the posture of the filter portion 112 of the cap 110 maintained, the cap 110 can be stably held. Thus, when the cap attachment device 100 changes from the waiting state to the attachment state, the filter portion 112 can be appropriately inserted into the snap vial 120.

Further, when the cap body 111 of each cap 110 is pushed downwardly from above, the filter holding film 230 is pushed from above by the cap body 111 that has passed through the corresponding opening 221 of the cap holding film 220. In this case, the filter holding film 230 is elastically deformed, so that each opening 231 is widened. Thus, each cap main body 111 slides downwardly and passes through the corresponding opening 231. As a result, each cap 110 can pass downwardly through the body plate 210.

Figure 13:
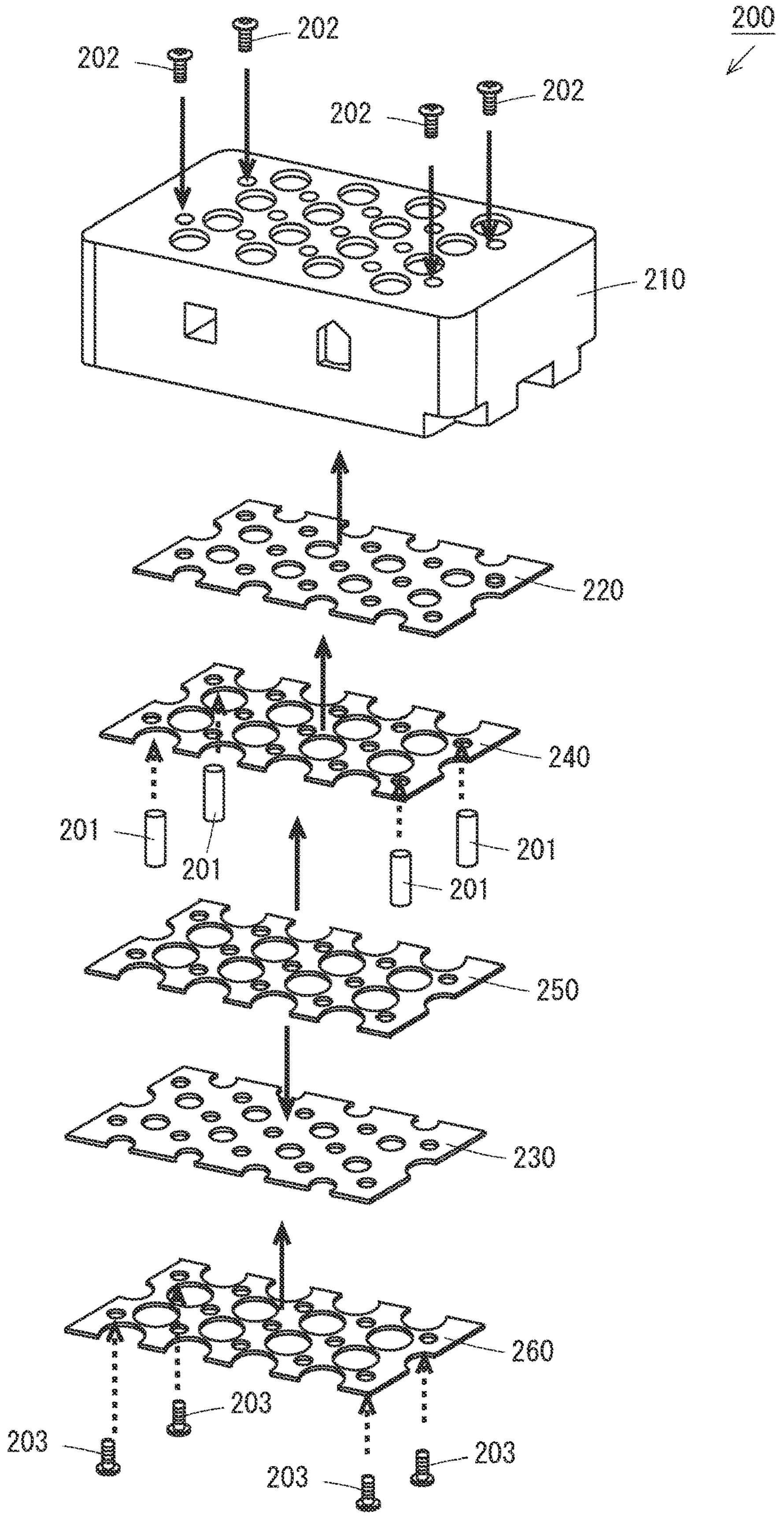
FIG. 13 is a diagram showing one example of assembly of the cap plate of FIG. 12.

FIG. 13 is a diagram showing one example of assembly of the cap plate 200 of FIG. 12. As shown in FIG. 13, the cap plate 200 further includes metal sheets 240, 250, 260. In each of the metal sheets 240, 250, 260, a plurality of openings respectively corresponding to the plurality of openings 221 of the cap holding film 220 are formed. The diameter of the opening of each of the metal sheets 240, 250, 260 is larger than the diameter of the cap body 111 of the cap 110.

Below the body plate 210, the cap holding film 220, the metal sheet 240, the metal sheet 250, the filter holding film 230 and the metal sheet 260 are aligned in this order from above to below. Here, a plurality of cylindrical spacers 201 are arranged between the metal sheet 240 and the metal sheet 250. A screw groove is formed on the inner peripheral surface of each cylindrical spacer 201.

In this state, a plurality of screws 202 are screwed into the plurality of cylindrical spacers 201 from above through the body plate 210, the cap holding film 220 and the metal sheet 240. Further, a plurality of screws 203 are screwed into the plurality of cylindrical spacers 201 from below through the metal sheet 260, the filter holding film 230 and the metal sheet 250. Thus, the cap holding film 220 is held by the body plate 210 and the metal sheet 240. Further, below the cap holding film 220, the filter holding film 230 is held by the metal sheet 260 and the metal sheet 250.

Figure 14:
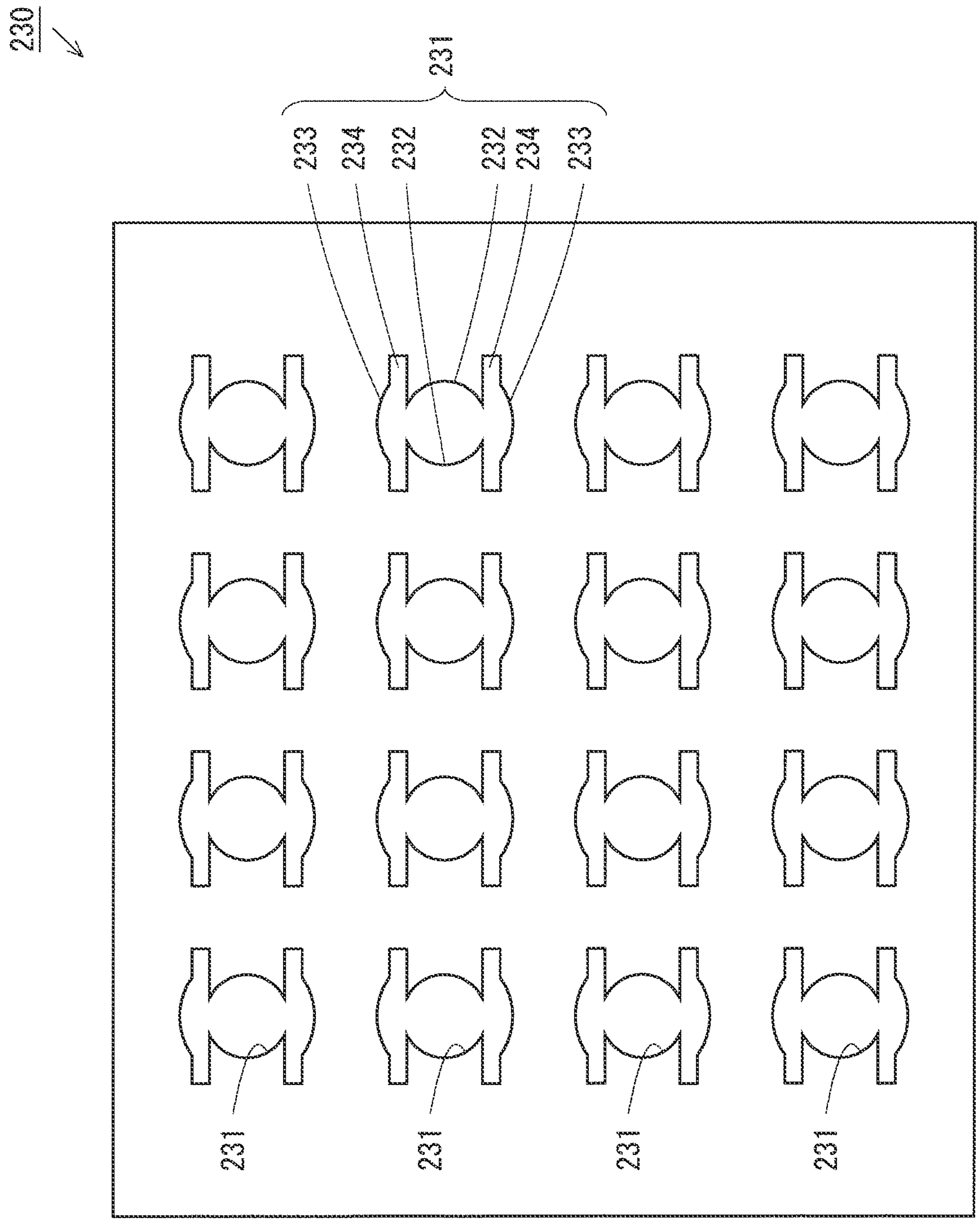
FIG. 14 is a plan view of a filter holding film.

FIG. 14 is a plan view of the filter holding film 230. As shown in FIG. 14, the filter holding film 230 has a rectangular shape. The plurality of openings 231 are regularly aligned in the direction of one pair of sides and the direction of the other pair of sides of the filter holding film 230. In the present example, each opening 231 includes a pair of arc portions 232, a pair of arc portions 233 and a pair of rectangular slits 234.

The pair of arc portions 232 is opposite to each other in the direction in which the one pair of sides of the filter holding film 230 extends (the left-and-right direction in the example of FIG. 14). The diameter of a virtual circle formed of the pair of arc portions 232 (the smallest diameter of the above-mentioned opening 231) is substantially equal to the diameter of the filter portion 112 of the cap 110. The one pair of arc portions 233 is opposite to each other in the direction in which the other pair of sides of the filter holding film 230 extends (the up-and-down direction in the example of FIG. 14). The diameter of a virtual circle formed of the pair of arc portions 233 is larger than the diameter of the filter portion 112 of the cap 110, and is substantially equal to the diameter of the cap body 111 of the cap 110, for example.

The pair of rectangular slits 234 extends in the direction in which the pair of arc portions 232 are opposite to each other. One rectangular slit 234 connects one end portions of the pair of arc portions 232 to one arc portion 233. The other rectangular slit 234 connects the other end portions of the pair of arc portions 232 to the other arc portion 233.

(2) Effects

In the cap plate 200 according to the present embodiment, the cap body 111 of the cap 110 is held by the body plate 210, and the filter portion 112 of the cap 110 is held by the filter holding film 230. In this case, because the cap 110 is stably held, when the cap holder 42 is lowered from the first height to the second height, the filter portion 112 can be reliably inserted into the snap vial 120. Thus, even in a case in which including the filter portion 112, the cap 110 can be suitably attached to the snap vial 120.

Specifically, the pair of arc portions 232 of each opening 231 of the filter holding film 230 abuts against the filter portion 112 of the cap 110, so that the filter portion 112 can be held. Further, because each opening 231 includes the pair of arc portions 233 having a large diameter, when the filter holding film 230 is pressed, the opening 231 is easily widened to the same extent as the cap body 111 of the cap 110. Thus, each cap 110 can pass downwardly.

The rib 213 that abuts against the outer peripheral surface of the cap body 111 is provided on the inner peripheral surface of the opening 211 of the body plate 210. Further, above the filter holding film 230, the cap holding film 220 in which the opening 221 having a diameter smaller than the diameter of the cap body 111 is formed is further provided. The opening 221 is located below the cap body 111. In these cases, the cap 110 can be held more reliably.

3. Other Embodiments (1) While the tip portion 36*b* of the plate pushing rod 36 has the tapered surface 36*d* in the above-mentioned embodiment, the embodiment is not limited to this. The tip portion 36*b* does not have to have the tapered surface 36*d*. Further, in a case in which not being used for the positioning between the cap plate 200 and the lifting-lowering unit 30, the plate pushing rod 36 may have the base portion 36*a* and does not have to have the tip portion 36*b*. Further, the opening 212 does not have to be formed in the upper surface of the body plate 210 of the cap plate 200.

(2) While the cap pushing rods 35 are lifted and lowered and the cap holder 42 is lowered by the single driver 20 in the above-mentioned embodiment, the embodiment is not limited to this. The cap holder 42 may be lowered by an actuator different from the driver 20. In this case, the lifting-lowering unit 30 does not have to include the plate pushing rod 36. Further, at the second height, the cap holder 42 does not have to bring the lower surface of the held cap plate 200 into contact with the upper surface of the vial plate 300.

Further, an actuator for lifting the cap holder 42 from the second height to the first height may be separately provided. In this case, the cap support unit 40 does not have to include the spring member 46. Further, in the base 10, the mechanical stopper for stopping the cap holder 42 at the first height does not have to be provided.

(3) While the cap plate 200 includes the cap holding film 220 in the above-mentioned embodiment, the embodiment is not limited to this. In a case in which the body plate 210 can stably hold the caps 110, the cap plate 200 does not have to include the cap holding film 220.

Further, although the ribs 213 are formed on the inner peripheral surface of the opening 211 of the main body plate 210, the embodiment is not limited to this. In a case in which the cap 110 is stably held in the opening 211 of the body plate 210, the ribs 213 do not have to be formed on the inner peripheral surface of the opening 211.

4. Aspects

It is understood by those skilled in the art that the plurality of above-mentioned illustrative embodiments are specific examples of the below-mentioned aspects.

(Item 1) A cap attachment device according to one aspect includes a cap holder that is provided to be liftable and lowerable between a first height and a second height lower than the first height, and holds a cap plate holding a cap, a vial platform which is provided below the cap holder and on which a vial plate holding a snap vial corresponding to the cap is placed, a cap pushing rod that is provided above the cap holder and extends in an up-and-down direction, and a driver that lifts and lowers the cap pushing rod such that the cap pushing rod pushes the cap held by the cap plate downwardly when the cap holder is at the second height.

In the cap attachment device, when the cap holder is at the first height, the cap holder and the vial platform are relatively largely spaced apart from each other. In this case, the cap plate and the vial plate can be easily carried into and carried out from the cap attachment device without interference of the cap plate and the vial plate with the cap holder or the vial platform.

Further, when the cap holder is at the second height, the cap holder and the vial platform are closer to each other than the time when the cap holder is at the first height. In this state, the cap pushing rod is lowered by the driver, so that the cap held by the cap plate is pushed downwardly. Thus, the cap is lowered from the cap plate and attached to the snap vial of the vial plate.

With this configuration, with the cap plate and the vial plate being sufficiently close to each other, the cap can be attached to the snap vial. Therefore, when the cap is attached to the snap vial, the posture of the cap is prevented from being largely changed. As a result, the cap can be appropriately attached to the snap vial.

(Item 2) The cap attachment device according to item 1, wherein the cap holder may bring a lower surface of the held cap plate into contact with an upper surface of the vial plate at the second height.

In this case, the cap is held by the cap plate until immediately before the cap is attached to the snap vial, so that the posture of the cap is maintained. Thus, the cap can be more suitably attached to the snap vial.

(Item 3) The cap attachment device according to item 2, wherein the driver may lift and lower the cap pushing rod, and may lower the cap holder from the first height to the second height.

In this case, the cap pushing rod is lifted and lowered, and the cap holder is lowered, by the single driver. It is not necessary to separately provide an actuator for lowering the cap holder from the first height to the second height. Further, the cost of the cap attachment device can be reduced.

(Item 4) The cap attachment device according to item 3, may further include a plate pushing rod that extends in the up-and-down direction, a supporter that supports the cap pushing rod and the plate pushing rod, and a first spring member provided between the plate pushing rod and the supporter, wherein the driver may lift and lower the plate pushing rod together with the cap pushing rod by lifting and lowering the supporter, and the plate pushing rod may lower the cap holder from the first height to the second height by pushing the cap plate from above.

In this case, with a simple configuration, the cap pushing rod can be lifted and lowered, and the cap holder can be lowered, by the single driver.

(Item 5) The cap attachment device according to item 4, wherein the plate pushing rod may include a base portion extending in the up-and-down direction, a tip portion extending downwardly from the base portion and a step portion provided between the base portion and the tip portion, and the cap plate may have a first opening into which the tip portion of the plate pushing rod is insertable in an upper surface.

In this case, the plate pushing rod can be used for the positioning between the cap plate and the cap pushing rod. Thus, the cap can be more suitably attached to the snap vial.

(Item 6) The cap attachment device according to item 5, wherein the tip portion of the plate pushing rod may have a tapered surface at a lower end portion, the tapered surface having a diameter that continuously decreases downwardly.

In this case, the positioning between the cap plate and the cap pushing rod can be more smoothly carried out.

(Item 7) The cap attachment device according to any one of items 1 to 6, may further include a second spring member that biases the cap holder upwardly.

In this case, the cap holder can be easily maintained at the first height. It is not necessary either to separately provide an actuator for lifting the cap holder from the second height to the first height. Further, the cost for the cap attachment device can be reduced.

(Item 8) A cap plate according to another aspect that is used in the cap attachment device according to any one of items 1 to 6, wherein the cap may include a cap body attached to the snap vial and a cylindrical filter portion extending downwardly from the cap body, and the cap plate may include a body plate in which a second opening into which the cap body is inserted is formed, and a filter holding film in which a third opening that abuts against an outer peripheral surface of the filter portion is formed and which is provided at the body plate.

In the cap plate, the cap body of the cap is held by the body plate, and the filter portion of the cap is held by the filter holding film. In this case, because the cap is stably held, when the cap holder is lowered from the first height to the second height, the filter portion can be reliably inserted into the snap vial. Thus, even in a case in which including the filter portion, the cap can be suitably attached to the snap vial.

(Item 9) The cap plate according to item 8, may further include a rib that is provided on an inner peripheral surface of the second opening and abuts against an outer peripheral surface of the cap body.

In this case, the cap can be held more reliably.

(Item 10) The cap plate according to item 8 or 9, may further include a cap holding film in which a fourth opening having a diameter smaller than a diameter of the cap body is formed, and which is provided above the filter holding film such that the fourth opening is located below the cap body.

In this case, the cap can be held more reliably.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A cap attachment device comprising:
- a cap holder that is provided to be liftable and lowerable between a first height and a second height lower than the first height, and holds a cap plate holding a cap;
- a vial platform which is provided below the cap holder and on which a vial plate holding a snap vial corresponding to the cap is placed;
- a cap pushing rod that is provided above the cap holder and extends in an up-and-down direction;
- a driver that lifts and lowers the cap pushing rod such that the cap pushing rod pushes the cap held by the cap plate downwardly when the cap holder is at the second height;
- a plate pushing rod that extends in the up-and-down direction;
- a supporter that supports the cap pushing rod and the plate pushing rod; and
- a first spring member provide the plate pushing rod and the supporter,
- wherein the driver lifts and lowers the plate pushing rod together with the cap pushing rod by lifting and lowering the supporter, and
- the plate pushing rod lowers the cap holder from the first height to the second height by pushing the cap plate from above.

2. The cap attachment device according to claim 1, wherein
- the cap holder brings a lower surface of the held cap plate into contact with an upper surface of the vial plate at the second height.

3. The cap attachment device according to claim 2, wherein
- the driver lifts and lowers the cap pushing rod, and lowers the cap holder from the first height to the second height.

4. The cap attachment device according to claim 1, wherein
- the plate pushing rod includes a base portion extending in the up-and-down direction, a tip portion extending downwardly from the base portion and a step portion provided between the base portion and the tip portion, and
- the cap plate has a first opening into which the tip portion of the plate pushing rod is insertable in an upper surface.

5. The cap attachment device according to claim 4, wherein
- the tip portion of the plate pushing rod has a tapered surface at a lower end portion, the tapered surface having a diameter that continuously decreases downwardly.

6. The cap attachment device according to claim 1, further comprising a second spring member that biases the cap holder upwardly.

* * * * *